United States Patent
Awada et al.

(10) Patent No.: US 12,445,915 B2
(45) Date of Patent: Oct. 14, 2025

(54) RECONFIGURATION MESSAGES DURING MULTI-CONNECTIVITY IN WIRELESS COMMUNICATION

(71) Applicant: Nokia Technologies Oy, Espoo (FI)

(72) Inventors: Ahmad Awada, Munich (DE); Srinivasan Selvaganapathy, Bangalore (IN); Elena Virtej, Espoo (FI); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 391 days.

(21) Appl. No.: 18/007,363

(22) PCT Filed: Jul. 23, 2021

(86) PCT No.: PCT/EP2021/070626
§ 371 (c)(1),
(2) Date: Jan. 30, 2023

(87) PCT Pub. No.: WO2022/028921
PCT Pub. Date: Feb. 10, 2022

(65) Prior Publication Data
US 2023/0308961 A1    Sep. 28, 2023

(30) Foreign Application Priority Data
Aug. 6, 2020  (IN) .............................. 202041033769

(51) Int. Cl.
*H04W 36/00*  (2009.01)
(52) U.S. Cl.
CPC ............................ *H04W 36/00698* (2023.05)

(58) Field of Classification Search
CPC ........... H04W 36/00698; H04W 72/02; H04W 72/0446; H04W 72/541; H04W 16/28
See application file for complete search history.

(56) References Cited

U.S. PATENT DOCUMENTS

| | | | |
|---|---|---|---|
| 6,241,400 B1* | 6/2001 | Melo | G06F 13/423 710/313 |
| 2007/0288930 A1* | 12/2007 | Yim | G06F 9/485 718/107 |

(Continued)

FOREIGN PATENT DOCUMENTS

WO    2019/097470 A1    5/2019

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.8.0, Dec. 2019, pp. 1-71.

(Continued)

*Primary Examiner* — Christine Ng
(74) *Attorney, Agent, or Firm* — Lippes Mathias LLP

(57) ABSTRACT

A method comprising, during multi-connectivity: sending a re-configuration message for execution by a user equipment; and sending a flag indicating an action to be taken by the user equipment during or after execution by the user equipment of an existing reconfiguration message, wherein the flag is configured to distinguish between at least two of the following actions: discarding the reconfiguration message; executing the reconfiguration message after executing an existing reconfiguration message; or prioritizing execution of the reconfiguration message over execution of an existing reconfiguration message.

20 Claims, 12 Drawing Sheets

(56) References Cited

U.S. PATENT DOCUMENTS

| | | | | |
|---|---|---|---|---|
| 2012/0113866 A1* | 5/2012 | Tenny | ............... | H04W 24/10 |
| | | | | 370/254 |
| 2013/0007679 A1* | 1/2013 | Mendel | ............ | H03K 19/17758 |
| | | | | 716/106 |
| 2015/0105062 A1* | 4/2015 | Quan | ............... | H04W 76/27 |
| | | | | 455/418 |
| 2015/0358137 A1* | 12/2015 | Chae | ............... | H04L 1/1854 |
| | | | | 370/329 |
| 2016/0134113 A1* | 5/2016 | Dushane | ............... | H02J 13/00 |
| | | | | 700/295 |
| 2016/0277214 A1* | 9/2016 | Guntaka | ............. | H04L 41/0803 |
| 2017/0222876 A1 | 8/2017 | Van Der Velde et al. | | |
| 2018/0035485 A1 | 2/2018 | Lee et al. | | |
| 2019/0191345 A1 | 6/2019 | Yamada | | |
| 2020/0015305 A1 | 1/2020 | Wu | | |
| 2020/0077385 A1 | 3/2020 | Van Der Velde et al. | | |
| 2020/0084823 A1* | 3/2020 | Wikström | ............. | H04W 76/27 |
| 2021/0160136 A1* | 5/2021 | Bao | ............... | H04W 76/15 |
| 2023/0189112 A1* | 6/2023 | Wu | ............... | H04W 36/00837 |
| | | | | 455/437 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"Remaining issues on RRC message handling for conditional intra-SN PSCell change without MN involvement", 3GPP TSG-RAN WG2 Meeting #109 Electronic, R2-2001151, Agenda Item: 6.9.4.1, Qualcomm Incorporated, Feb. 24-Mar. 6, 2020, 3 pages.

"MN-initiated Reconfigurations during conditional PSCell change", 3GPP TSG-RAN WG2 Meeting #109e, R2-2001005, Agenda Item: 6.9.4.1, Nokia, Feb. 24-Mar. 6, 2020, 4 pages.

"CR to 38.473 on clarification to RRC reconfigure complete indicator"; 3GPP TSG-RAN WG3 #103bis, R3-191929, Huawei, Apr. 8-12, 2019, 5 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.10.0, Jul. 2020, pp. 1-965.

International Search Report and Written Opinion received for corresponding Patent Cooperation Treaty Application No. PCT/EP2021/070626, dated Nov. 12, 2021, 33 pages.

"Description of EN-DC procedures", 3GPP TSG-RAN WG3 Meeting #96, R3-172014, Nokia, May 15-17, 2017, 14 pages.

"Full configuration in EN-DC", 3GPP TSG-RAN WG2 #100, R2-1713390, Agenda Item: 10.4.1.3.4, Ericsson, Nov. 7-Dec. 1, 2017, pp. 1-6.

* cited by examiner

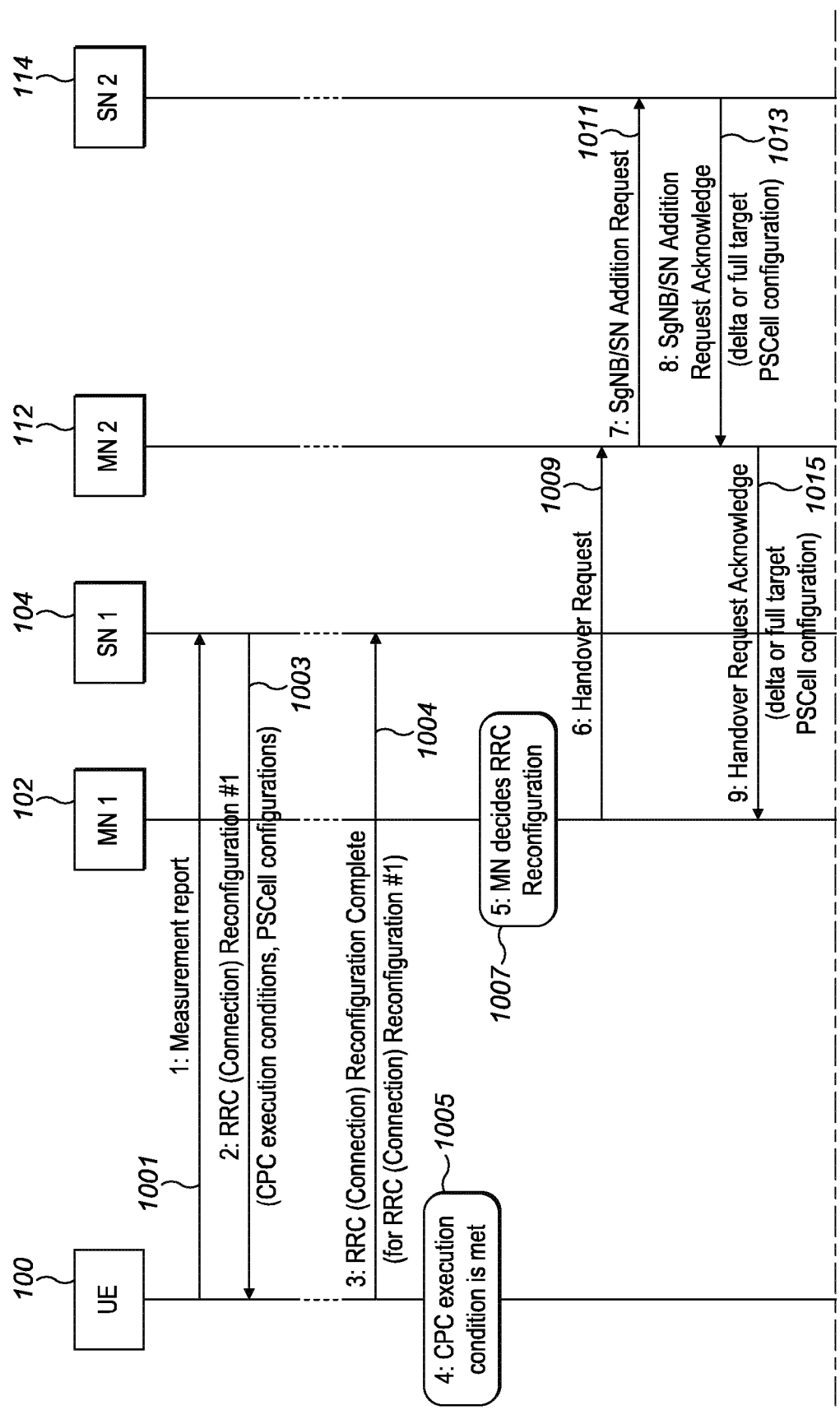

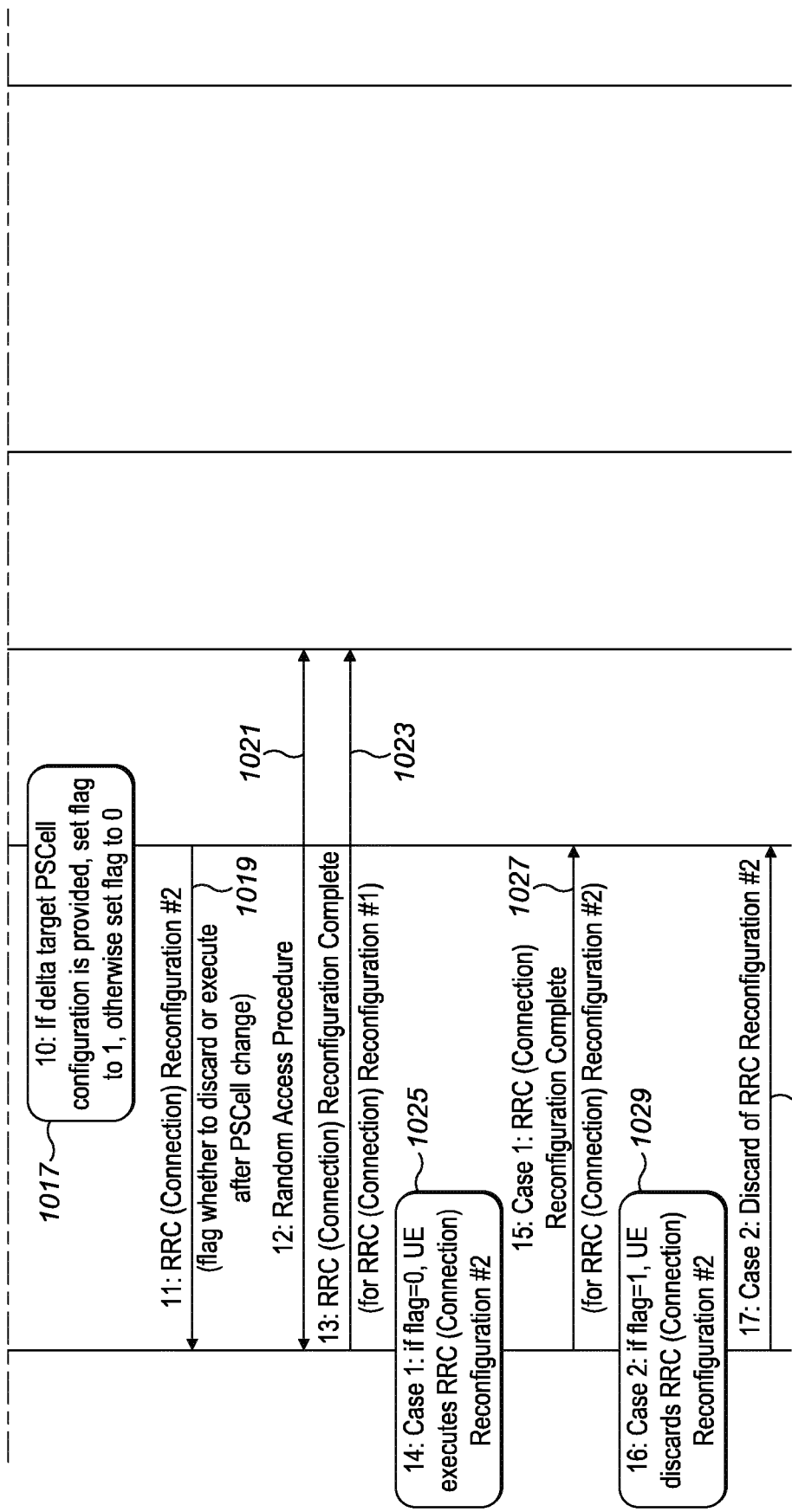

RECONFIGURATION MESSAGES DURING MULTI-CONNECTIVITY IN WIRELESS COMMUNICATION

RELATED APPLICATION

This application was originally filed as PCT Application No. PCT/EP2021/070626, filed on Jul. 23, 2021, which claims priority from IN application No. 202041033769, filed on Aug. 6, 2020, each of which is incorporated herein by reference in its entirety.

TECHNOLOGICAL FIELD

Examples of the present disclosure relate to reconfiguration messages during multi-connectivity in wireless communication. Some examples relate to radio resource control (RRC) reconfiguration messages during Evolved Universal Terrestrial Radio Access (E-UTRA)—5th Generation (5G) New Radio (NR) multi-connectivity.

BACKGROUND

Multi-Radio Dual Connectivity (MR-DC) is an example of multi-connectivity. MR-DC enables a user equipment (UE) with multiple receivers/transmitters to utilise resources provided by different nodes. During multi-connectivity, the UE stores a configuration.

An established multi-connectivity connection can be reconfigured by transmitting a reconfiguration message. In 3GPP systems, the reconfiguration message is referred to as a RRC reconfiguration message or RRC reconfiguration message.

In some circumstances it may be desirable to provide improved handling of reconfiguration messages in multi-connectivity.

BRIEF SUMMARY

According to various, but not necessarily all, embodiments there is provided a method comprising, during multi-connectivity:
  sending a reconfiguration message for execution by a user equipment; and
  sending a flag indicating an action to be taken by the user equipment during or after execution by the user equipment of an existing reconfiguration message, wherein the flag is configured to distinguish between at least two of the following actions:
    discarding the reconfiguration message;
    executing the reconfiguration message after executing an existing reconfiguration message; or
    prioritizing execution of the reconfiguration message over execution of an existing reconfiguration message.

According to various, but not necessarily all, embodiments there is provided a method comprising, during multi-connectivity:
  receiving a query from a first master node, wherein the query is initiated by a decision by the first master node to send a reconfiguration message for execution by a user equipment, wherein the reconfiguration message comprises an inter-master node handover from the first master node to a target master node;
  obtaining configuration information associated with the reconfiguration message; and sending a response to the query, based on the configuration information, to enable the first master node to send a flag indicating the action to be taken by the user equipment during or after execution by the user equipment of an existing reconfiguration message, wherein the flag is configured to distinguish between at least two of the following actions: discarding the reconfiguration message;
    executing the reconfiguration message after executing an existing reconfiguration message; or
    prioritizing execution of the reconfiguration message over execution of an existing reconfiguration message.

According to various, but not necessarily all, embodiments there is provided a method comprising, during multi-connectivity:
  receiving a query from a master node, wherein the query is indicative of a master-node initiated decision to send a reconfiguration message for execution by a user equipment; and sending a response to the query, wherein the response comprises a flag indicating an action to be taken by the user equipment during or after execution by the user equipment of an existing reconfiguration message, wherein the flag is configured to distinguish between at least two of the following actions:
    discarding the reconfiguration message;
    executing the reconfiguration message after executing an existing reconfiguration message; or
    prioritizing execution of the reconfiguration message over execution of an existing reconfiguration message.

According to various, but not necessarily all, embodiments there is provided a method comprising, during multi-connectivity:
  receiving a reconfiguration message for execution by a user equipment;
  receiving a flag indicating an action to be taken by the user equipment during or after execution by the user equipment of an existing reconfiguration message; and
  performing the action indicated by the flag during or after execution by the user equipment of an existing reconfiguration message,
  wherein the flag is configured to distinguish between at least two of the following actions:
    discarding the reconfiguration message;
    executing the reconfiguration message after executing an existing reconfiguration message; or
    prioritizing execution of the reconfiguration message over execution of an existing reconfiguration message.

According to various, but not necessarily all, embodiments there is provided a method comprising, during multi-connectivity:
  sending reconfiguration message information associated with a reconfiguration message for execution by a user equipment; and
  sending a flag or information that causes the flag to be set, indicating an action to be taken by the user equipment during or after execution by the user equipment of an existing reconfiguration message, wherein the flag is configured to distinguish between at least two of the following actions:
    discarding the reconfiguration message;
    executing the reconfiguration message after executing an existing reconfiguration message; or
    prioritizing execution of the reconfiguration message over execution of an existing reconfiguration message.

According to various, but not necessarily all, embodiments there is provided apparatus comprising means for causing any one or more of the methods to be performed.

According to various, but not necessarily all, embodiments there is provided a system comprising multiple apparatus.

According to various, but not necessarily all, embodiments there is provided a computer program that, when run on a computer, causes any one or more of the methods to be performed.

According to various, but not necessarily all, embodiments there is provided examples as claimed in the appended claims.

BRIEF DESCRIPTION

Some examples will now be described with reference to the accompanying drawings in which:

FIG. 10 shows another example of the subject matter described herein;

| DEFINITIONS | |
|---|---|
| 3GPP | 3$^{rd}$ Generation Partnership Project |
| 5G | 5$^{th}$ Generation Standard for Cellular Networks |
| CPC | Conditional PSCell Change |
| E-UTRA | Evolved Universal Terrestrial Radio Access |
| eNB | eNodeB |
| gNB | gNodeB |
| gNB-CU | gNodeB centralized unit |
| gNB-DU | gNodeB distributed unit |
| MCG | Master Cell Group |
| MN | Master Node |
| NR | New Radio |
| PCell | Primary Cell |
| PSCell | Primary Secondary Cell |
| RAN | Radio Access Network |

-continued

| DEFINITIONS | |
|---|---|
| RAT | Radio Access Technology |
| RLC | Radio Link Control |
| RLF | Radio Link Failure |
| RRC | Radio Resource Control |
| SCell | Secondary Cell |
| SCG | Secondary Cell Group |
| SgNB | Secondary gNodeB |
| SN | Secondary Node |
| UE | User Equipment |

DETAILED DESCRIPTION

Figure 1:
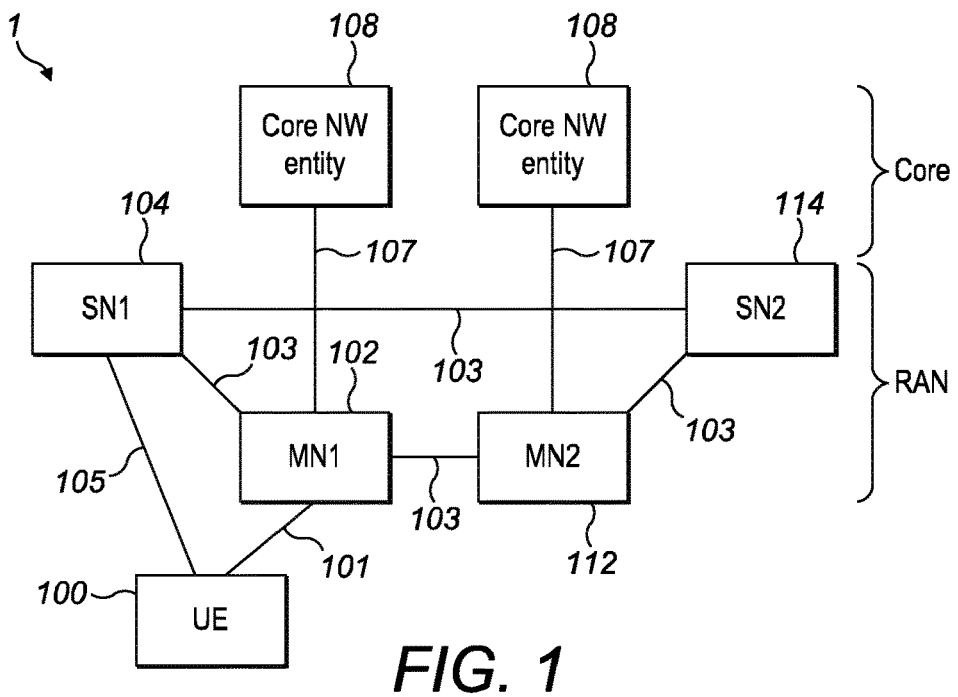
FIG. 1 shows an example of the subject matter described herein.

FIG. 1 is a block diagram schematically illustrating a wireless communication network system 1 configured for multi-connectivity. In at least some examples the system 1 is a 3GPP-defined network system.

The system 1 of FIG. 1 comprises a UE 100, a RAN comprising at least a first node 102 and a second node 104, and a core network (NW) entity 108. FIG. 1 further illustrates a third node 112 and fourth node 114 of the RAN, enabling the UE 100 to change nodes during mobility.

The term 'node' herein refers to an access node. In a 3GPP-defined system 1 a node is a base station. A base station implementing NR is referred to as a gNB. A base station implementing E-UTRA is referred to as an eNB.

Figure 2:
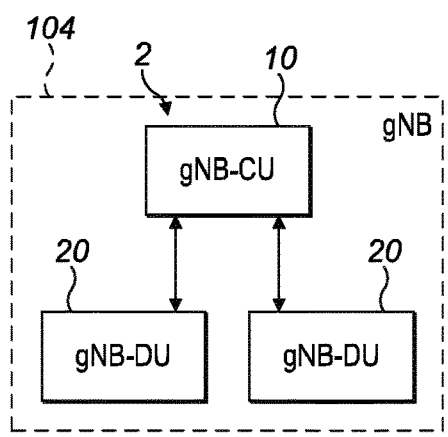
FIG. 2 shows another example of the subject matter described herein.

FIG. 2 illustrates an example of a node 104/114 (e.g. gNB) configured to implement a first radio access technology (RAT) (e.g. NR). In this example, the node 104 has a disaggregated (split) architecture. The gNB 104 comprises one or more distributed units (gNB-DU) 20 and a centralized unit (gNB-CU) 10. An apparatus 2 is configured to implement the functionality of at least part of a node 104, 114 such as a gNB-CU, and/or one or more gNB-DUs, or the whole gNB.

The gNB-CU 10 is a logical node configured to host a Radio Resource Control layer (RRC) and other layers of the gNB 120. The gNB-CU 10 controls the operation of one or more gNB-DUs 20. The gNB-DU 20 is a logical node configured to host a Radio Link Control Protocol layer (RLC), Medium Access Control layer (MAC) and Physical layer (PHY) of the access node (gNB) 120. The gNB-DU 20 communicates via a dedicated interface (F1) to the RRC layer hosted by the gNB-CU.

One gNB-DU 20 can support one or multiple cells (not illustrated in the figure). One cell is supported by only one gNB-DU 20.

Figure 3:
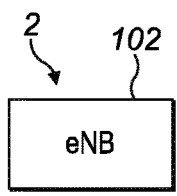
FIG. 3 shows another example of the subject matter described herein.

FIG. 3 illustrates an example of a node 102/112 (e.g. eNB) configured to implement a second RAT (e.g. E-UTRA). In this example, the node 102 does not have a disaggregated architecture. The eNB 102 is a logical node configured to host a Radio Resource Control layer (RRC) and other layers of the eNB 102. An apparatus 2 is configured to implement the functionality of at least part of a node 102, 112 such as an eNB.

Referring back to FIG. 1, the nodes 102, 104, 112, 114 are operably coupled to one another via a network interface 103. In an example implementation the network interface 103 comprises an X2 interface.

A UE 100 can operably couple to a node 102 via a radio interface 101. In this example, the radio interface 101 is a wireless interface. In an example implementation the radio interface 101 comprises a Uu interface. During multi-connectivity, the UE 100 can concurrently couple to another node 104 via a radio interface 105. In some examples, the radio interfaces 101, 105 comprise the same type of interface.

One node 102 to which the UE 100 is operably coupled can be configured to act as a Master Node (MN). The other node 104 to which the UE 100 is operably coupled can be configured to act as a Secondary Node (SN).

In FIG. 1, the first node 102 is a first Master Node (MN1), the second node 104 is a first Secondary Node (SN1), the third node 112 is a second Master Node (MN2), and the fourth node 114 is a second Secondary Node (SN2). In FIG. 1, MN1 102 and SN1 104 are serving (source) nodes.

At least a MN 102, 112 can operably couple to a core network entity 108, via an interface 107. A SN 104, 114 may operably couple to a core network entity 108. In FIG. 1, MN1 102 and MN2 112 are operably coupled to different core network entities 108 via the interface 107, or could be operably coupled to the same entity.

In a first example, the MN 102, 112 is an eNB configured to implement E-UTRA. The core network entity 108 comprises an Evolved Packet Core (EPC) entity. The entity 108 may comprise a Mobility Management Entity (MME) and/or a Service Gateway (S-GW). The interface 107 comprises an S1 interface.

In a second example, the MN 102, 112 is a gNB configured to implement NR. The core network entity 108 comprises a 5G Core (5GC) entity. The entity 108 may comprise an Access and Mobility Management Function (AMF). The interface 107 comprises an NG-C interface.

Examples of multi-connectivity are provided below. In most, but not all of these examples, a SN 104, 114 implements a different RAT from the MN 102, 112.

One example is E-UTRA-NR Dual Connectivity (EN-DC), in which an eNB acts as a MN 102/112 and a gNB acts as a SN 104/114. This example is referred to throughout this specification. However, aspects of the present disclosure are also applicable to the other examples set out below.

Another example is next generation RAN (NG-RAN) E-UTRA-NR Dual Connectivity (NGEN-DC), in which an eNB (e.g. next generation eNB: ng-eNB) acts as a MN and a gNB acts as a SN.

Another example of dual-connectivity is NR-E-UTRA Dual Connectivity (NE-DC), in which a gNB acts as a MN and an ng-eNB acts as a SN.

Another example of dual-connectivity is NR-NR Dual Connectivity (NR-DC), in which one gNB acts as a MN and another gNB acts as a SN. In another example of NR-DC, a UE 100 is connected to two gNB-DUs, one serving a master cell group (MCG) and the other serving a secondary cell group (SCG), connected to the same gNB-CU, acting as a MN and as a SN.

In at least some examples of multi-connectivity, a node 102, 104, 112, 114 comprises a cell group of one or more cells. A cell group comprises a primary cell and zero or more secondary cells.

A cell relates to a geographical area with radio signal i.e. covered by a base station where a UE could connect and get service. A cell can be identified by lower layer Physical Cell Identity (PCI) and higher layer cell identity.

A primary cell is the cell, operating on a primary frequency, in which a UE 100 either performs an initial connection establishment procedure or initiates a connection re-establishment procedure, or is the cell indicated as the primary cell in a handover procedure. In at least some examples, a primary cell is a cell configured to provide Non-Access Stratum (NAS) mobility information during connection establishment, re-establishment or handover.

The primary cell may be configured to provide security input during connection re-establishment or handover.

A secondary cell is the cell, operating on a secondary frequency, which may be configured once a RRC connection is established and which may be used to provide additional radio resources. Secondary Cells (SCells) can be configured to form a set of serving cells together with the PCell.

In multi-connectivity, a cell group of a MN 102/112 is a master cell group (MCG). A cell group of a SN 104/114 is a secondary cell group (SCG). A MCG comprises a primary cell (PCell) and zero or more secondary cells (SCells). A SCG comprises a primary secondary cell (PSCell) and zero or more secondary cells (SCells). In at least some examples, MCGs and SCGs comprise at least one SCell in addition to a PCell or a PSCell.

When multi-connectivity is first established, a UE 100 stores a configuration in memory. The configuration comprises information identifying a MCG including a PCell and zero or more SCells, and a SCG including a PSCell and zero or more SCells, and one or more bearers.

The configuration may include one or more of: information for measurement configuration; information for mobility control; radio resource configuration information (including radio bearers, MAC main configuration and physical channel configuration); and/or an Access Stratum (AS) security configuration.

After applying (executing) a configuration, the UE can be able to receive and transmit data over MCG and SCG bearers using radio links provided by the MN and the SN.

A multi-connectivity connection can be reconfigured by transmitting a reconfiguration message, to be executed by the UE 100. When executed, the stored configuration is updated. 3GPP standard 37.340 for multi-connectivity defines reconfiguration messages as RRC reconfiguration messages.

An SN-initiated RRC Reconfiguration message can be sent from a PSCell or from a SCell, or both in the case of carrier aggregation duplication. A MN-initiated RRC Reconfiguration message can be sent from a PCell or from a SCell, or both.

Examples of reconfiguration messages in multi-connectivity include, but are not limited to:

a) SN Modification (MN/SN initiated) for modifying, establishing (adding) or releasing (removing) bearer contexts (configurations/properties), to transfer bearers to and from the SN 104, or to modify other properties of the UE context within the same SN 104. Examples include the addition, modification or release of SCG bearer(s) and the SCG RLC bearer of split bearer(s), as well as configuration changes for SN-terminated MCG bearers. A bearer is a data tunnel associated with a termination point in the RAN or core network. Modification of a bearer may comprise changing a termination point, e.g. from MN to SN, changing the mapping of quality of service (QoS) flows to radio bearers, changing logical channel identities, changing RLC bearer properties including timers, changing RLC mode e.g. changing Service Data Adaptation Protocol (SDAP), Packet Data Convergence Protocol (PDCP) and RLC properties.

b) SN Change (MN/SN initiated) to transfer a UE context from a source SN 104 to a target SN 114 and to change the SCG configuration in the UE 100 from the source SN 104 to that of the target SN 114.

c) Inter-MN handover (with/without MN-initiated SN change) to transfer context data from a source MN 102 to a target MN 112 while the context at the SN 104 is kept or moved to another SN 114. During an Inter-MN handover, the target MN 112 may decide whether to keep or change the source SN 104, or release the source SN 104.

Figure 4:
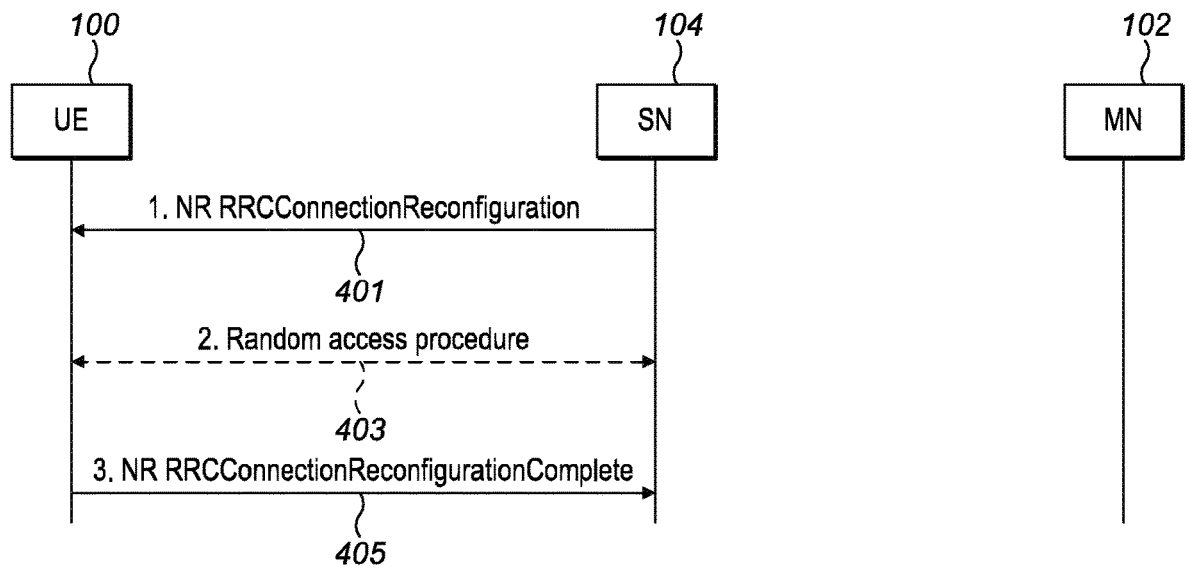
FIG. 4 shows another example of the subject matter described herein.

FIG. 4 is a message sequence chart illustrating an example reconfiguration message comprising a SN-initiated SN modification request without MN involvement. Since the SN 104 does not change, this is referred to as an intra-SN reconfiguration message.

Such reconfiguration messages can be used to modify the configuration of the SN 104 in case no coordination with the MN 102 is required. This includes the addition, modification and release of SCG Scell(s), and PSCell changes, without changing the SN 104. In at least the below-described examples, the reconfiguration message comprises a PSCell change.

In operation 401, the SN 104 sends a RRC reconfiguration message ('NR RRCConnectionReconfiguration') to the UE 100. The message may be sent over a bearer such as Signal Radio Bearer 3 (SRB3). The UE 100 executes the RRC reconfiguration message to modify (e.g. replace/update) its stored configuration. In case the UE 100 is unable to comply with at least part of the configuration included in the RRC Reconfiguration message, the UE 100 may perform a reconfiguration failure procedure.

In operation 403, If instructed by SN 104, the UE 100 performs access to the new target PSCell ('random access procedure'). The procedure may comprise synchronisation towards the target PSCell of the SN 104. Performing access may comprise a RACH process (random access channel process).

In operation 405, the UE 100 sends a reply ('NR RRCConnectionReconfigurationComplete') to the SN 104, reporting that a configuration of the reconfiguration message has been applied (e.g. that the UE 100 has modified its stored configuration to the new configuration enabled by the RRC reconfiguration message).

Figure 5:
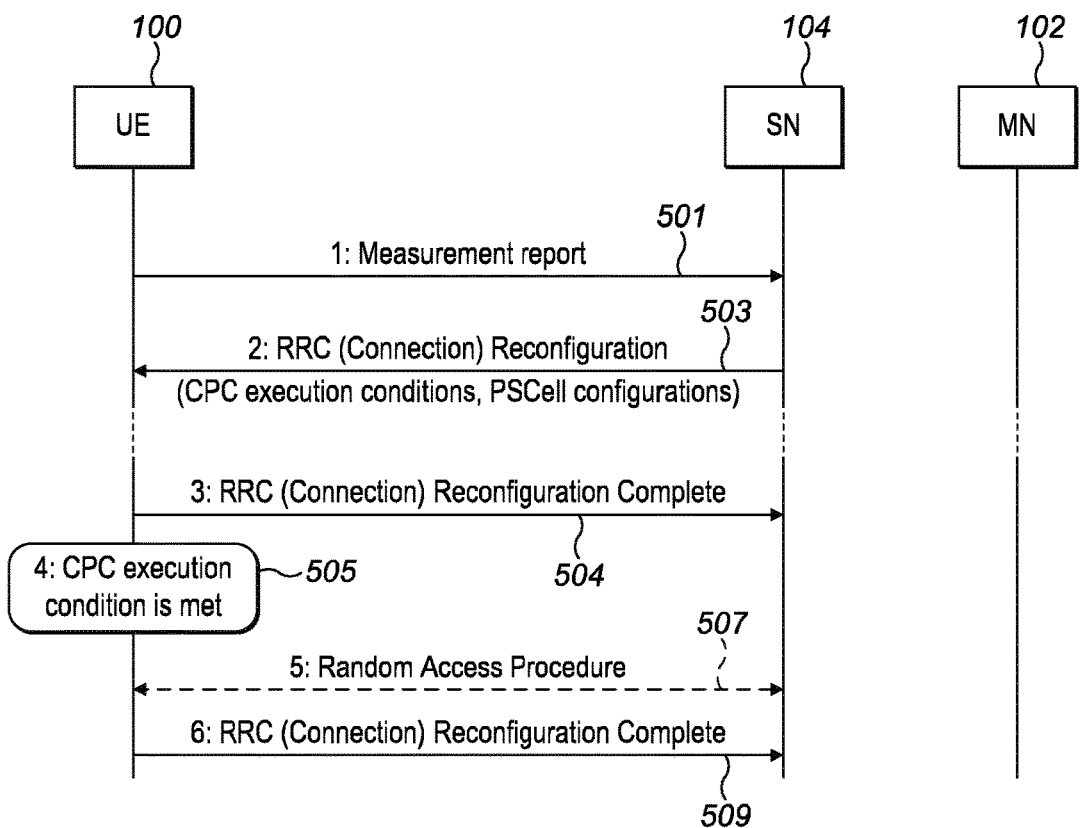
FIG. 5 shows another example of the subject matter described herein.

In at least some examples, the reconfiguration message can be a conditional reconfiguration message. This is illustrated in FIG. 5, which illustrates an example of a conditional PSCell change (CPC). Like FIG. 4, the illustrated reconfiguration message is a SN-initiated SN modification request without MN involvement.

Operation 501 comprises the UE 100 sending measurements to the SN 104 ('measurement report'). The measurements may comprise signal power and/or signal quality measurements, such as Reference Signal Receive Power (RSRP) or Reference Signature Received Quality (RSRQ). Upon receiving the measurements from the UE 100, the Source SN 104 may prepare multiple candidate target PSCells in the same SN 104 in dependence on the measurements. The term 'Source' means a currently serving node or cell. Preparing candidate target PSCells may comprise reserving resources such as RACH resources (contention-free random-access preamble), Cell Radio Network Temporary Identifier (C-RNTI), or radio resources for guaranteed bit rate services, etc.

Operation 503 comprises the source PSCell sending to the UE 100 a RRC reconfiguration message ('RRC (Connection) Reconfiguration'). This comprises sending to the UE 100 one or more CPC execution conditions, and sending to the UE 100 the configuration of the prepared candidate PSCell or PSCells. CPC execution conditions can be offset-based and/or threshold-based, for example. An offset-based condition can be satisfied when Mt>Ms+Offset, wherein Mt is the measurement of the target PSCell, Ms is the measurement of the serving PSCell, and the offset is a configured offset. A threshold-based condition can be satisfied when Ms<threshold1 (Ms becomes worse than threshold1) and Mt>threshold2 (Mt becomes better than threshold2). Both the offset method and the threshold method could be applied concurrently and if at least one is satisfied, the CPC execution condition could be satisfied.

In operation 504, the UE 100 sends a reply ('RRC (Connection) Reconfiguration Complete') to the SN 104, reporting that the reconfiguration has been applied. In FIG. 5, the report that the reconfiguration has been applied is sent prior to satisfaction of the CPC execution condition. The term 'applied' does not mean that the UE has finished executing the instructions (e.g. CPC execution condition) of the RRC reconfiguration message.

Operation 505 comprises the UE 100 determining that the CPC execution condition is satisfied. For example, the UE 100 may determine that a particular cell of the SN 104 satisfies the execution condition, and may select that cell as the new PSCell, Operation 507 is similar to operation 403 and is performed in dependence on satisfaction of the condition.

Operation 509 is similar to operation 504 but is sent to the new PSCell, indicating that the UE has completed the CPC execution procedure (e.g. the UE 100 has performed operation 507).

In both of the above cases of FIGS. 4 and 5, the MN 102 is not aware that the UE 100 is performing a PSCell change. Therefore, while the UE 100 is executing the existing RRC reconfiguration message #1 (PSCell change), the UE 100 continues radio communication with the MN 102 and may receive a new RRC reconfiguration message #2 from the MN 102.

One approach is for the UE 100 to store the new RRC reconfiguration message #2, continue the execution of the existing RRC reconfiguration message #1 (PSCell change) and then apply the new RRC Reconfiguration.

Figure 6:
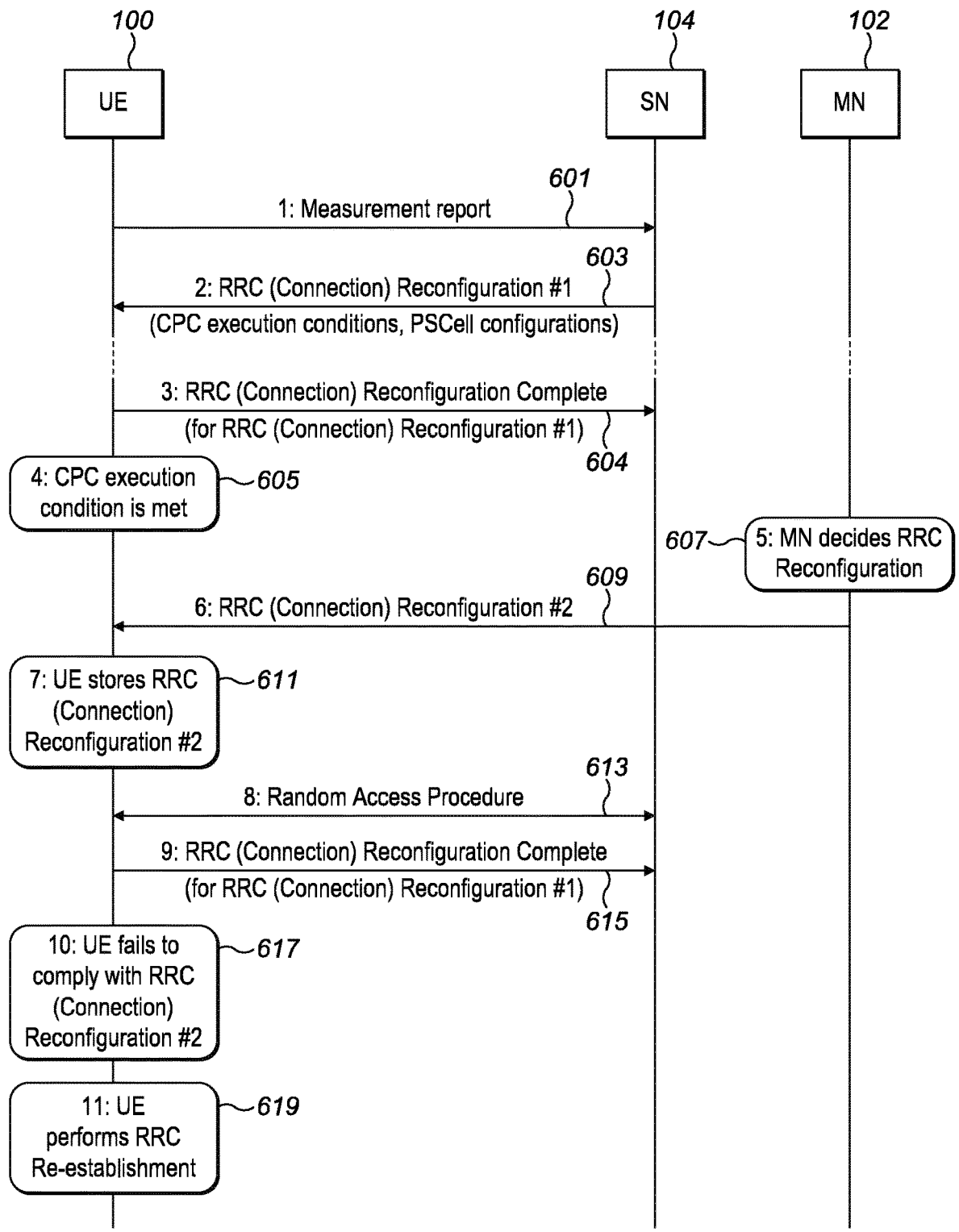
FIG. 6 shows another example of the subject matter described herein.

An issue with the above approach is that the UE 100 may fail to comply with the new RRC reconfiguration message received from the MN 102, because in some situations it is not possible to execute the new RRC reconfiguration message after the UE 100 has executed the PSCell change. This would result in the UE 100 performing re-establishment as defined in 3GPP TS 36.331 Rel. 15 (5.3.5.5). This problem is illustrated in FIG. 6.

Operations, 601, 603, 604, 605 relate to an existing reconfiguration message #1 and correspond to operations 501, 503, 504, 505 of FIG. 5. Alternatively, the existing reconfiguration message #1 may be non-conditional as defined in operations 401, 403 of FIG. 4.

Operation 607 comprises the MN 102 determining to send a RRC reconfiguration message #2 ('MN decides RRC Reconfiguration') to the UE 100, without knowledge of the existing RRC reconfiguration message #1. In a first example, the new RRC reconfiguration message #2 is a MN-initiated SN modification procedure. In a second example, the new RRC reconfiguration message #2 is a SN-initiated SN modification procedure with MN involvement.

Operation 609 comprises the MN 102 sending the RRC reconfiguration message #2 to the UE 100 ('RRC (Connection) Reconfiguration #2'). The RRC reconfiguration message #2 may either be conditional or not.

Operation 611 comprises the UE 100 receiving and storing the RRC reconfiguration message #2 ('UE stores RRC (Connection) Reconfiguration #2').

Operation 613 comprises the UE 100 performing access to the new target PSCell, as part of its ongoing execution of the existing RRC reconfiguration message #1 ('random access procedure').

Operation 615 is similar to operation 509 described earlier.

In operation 617, the UE 100 fails to comply with RRC reconfiguration message #2. As a result, in operation 619, the UE 100 may perform RRC re-establishment which can result in interruption of service to the user.

A non-exhaustive number of examples are provided below of when the UE 100 cannot comply with the new RRC reconfiguration message #2 after a PSCell change.

Example 1: the RRC reconfiguration message #2 comprises a MN-initiated SN modification without changing SN 104 or MN 102, to execute a modification such as modifying SCG bearer X. The MN 102 first sends a SgNB Modification Request message to the SN 104. The SN 104 responds with a SgNB Modification Request Acknowledge message which contains the new SCG radio configuration which the MN 102 can then provide to the UE 100 (operations 609, 611). After the UE 100 has performed the PSCell change of existing RRC reconfiguration message #1 (operation 613), the new target PSCell of RRC reconfiguration message #2 may have released SCG bearer X and accordingly the modification cannot be performed. The UE 100 performs re-establishment as it cannot comply with the new RRC reconfiguration message #2. A solution to example 1 is described later in relation to FIG. 8.

Example 2: The RRC reconfiguration message #2 comprises a MN-initiated SN change without a MN change, to execute an inter-SN change from source SN1 104 to target SN2 114. In this example, the MN 102 sends a SgNB/SN Addition Request message to SN2 114. SN2 114 responds with a SgNB/SN Addition Request Acknowledge message which comprises a configuration that the MN 102 can then provide to the UE 100. SN2's response may include an indication of whether a full configuration or a delta configuration is to be provided to the UE 100. A delta configuration is dependent on a reference configuration stored in the UE 100 whereas a full configuration is not dependent on a reference configuration. A delta configuration is a delta update that only provides the UE 100 with the parts of the configuration that have changed. The UE 100 applies those parts on top of the existing reference configuration (e.g. SCG configuration), to save time and bandwidth. By contrast, a full configuration comprises a whole configuration. If the RRC reconfiguration message #2 comprises a delta configuration, the UE 100 may be unable to apply the delta configuration on top of the new reference configuration (e.g. new source SCG configuration) after having executed (completed) the existing RRC reconfiguration message #1. For example, the delta configuration may request the UE 100 to modify an SCG bearer X that has been released by the new source SN. The UE 100 performs re-establishment. A solution to example 2 is described later in relation to FIG. 9.

Example 3: The RRC reconfiguration message #2 comprises an inter-MN handover with/without SN change, to execute an inter-MN change from MN1 102 to MN2 112 and an inter-SN change from SN1 104 to SN2 114. In this example, MN1 102 sends a Handover Request message to MN2 112. MN2 112 then obtains a configuration from SN2 114 and responds to MN1 102 with a Handover Request Acknowledge comprising the configuration that MN1 102 can provide to the UE 100. Similarly to example 2, the delta configuration may fail. A solution to example 3 is described later in relation to FIG. 10.

A further issue is that the new RRC reconfiguration message #2 provided by the MN1 102 may sometimes have a higher priority than execution of the existing RRC reconfiguration message #1 (e.g. PSCell change). This can happen for instance if the MN1 102 would like to trigger a PCell change (intra-MN or inter-MN handover). Waiting until the PSCell change is completed before triggering the PCell change may result in radio link failure (RLF).

In an example, a network node (PCell in MN 1 or PSCell in SN 1) may indicate to the UE whether the new RRC Reconfiguration received from MN 1 during PSCell change shall be discarded or applied after completing PSCell change (Conditional PSCell change or legacy PSCell change). The decision may be made by the network node based on whether the UE can comply with the new RRC Reconfiguration after PSCell change or not. The UE may inform the source PCell in MN if it has discarded the new RRC Reconfiguration after completion of PSCell change.

In another example, network node (PCell in MN 1 or PSCell in SN 1) indicates to the UE whether the execution of new RRC Reconfiguration may be prioritized over the PSCell change. In an example, if the network indicates to the UE to prioritize the execution of new RRC Reconfiguration, the UE terminates the execution of the PSCell change and executes the new RRC Reconfiguration. The UE may indicate to the network (PCell in MN 1 or PSCell in SN1) the termination of PSCell change.

Aspects and examples of the present disclosure propose various methods for reducing the need for connection re-establishment in multi-connectivity. The methods collectively comprise determination and transmission of a flag to the UE 100, that influences/determines a decision to be taken.

The flag indicates how the UE 100 should treat the RRC reconfiguration message #2 during or after execution by the UE 100 of an existing RRC reconfiguration message #1 which the initiator of message #2 is not involved in/aware of. Examples of such an existing RRC reconfiguration message #1 include an SN-initiated PSCell change without MN involvement, as defined in FIGS. 4-5.

Figure 7:
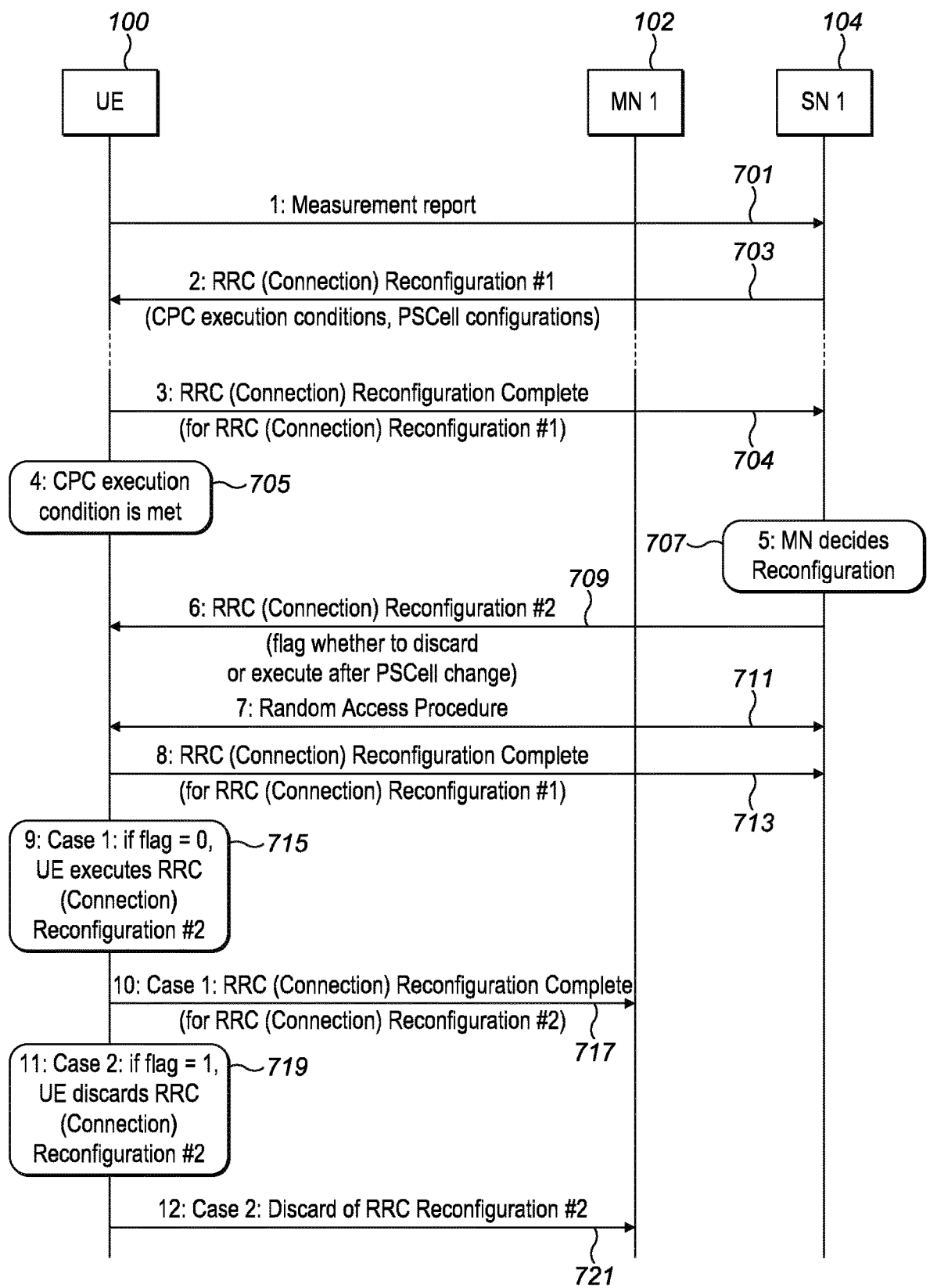
FIG. 7 shows another example of the subject matter described herein.
Figure 11:
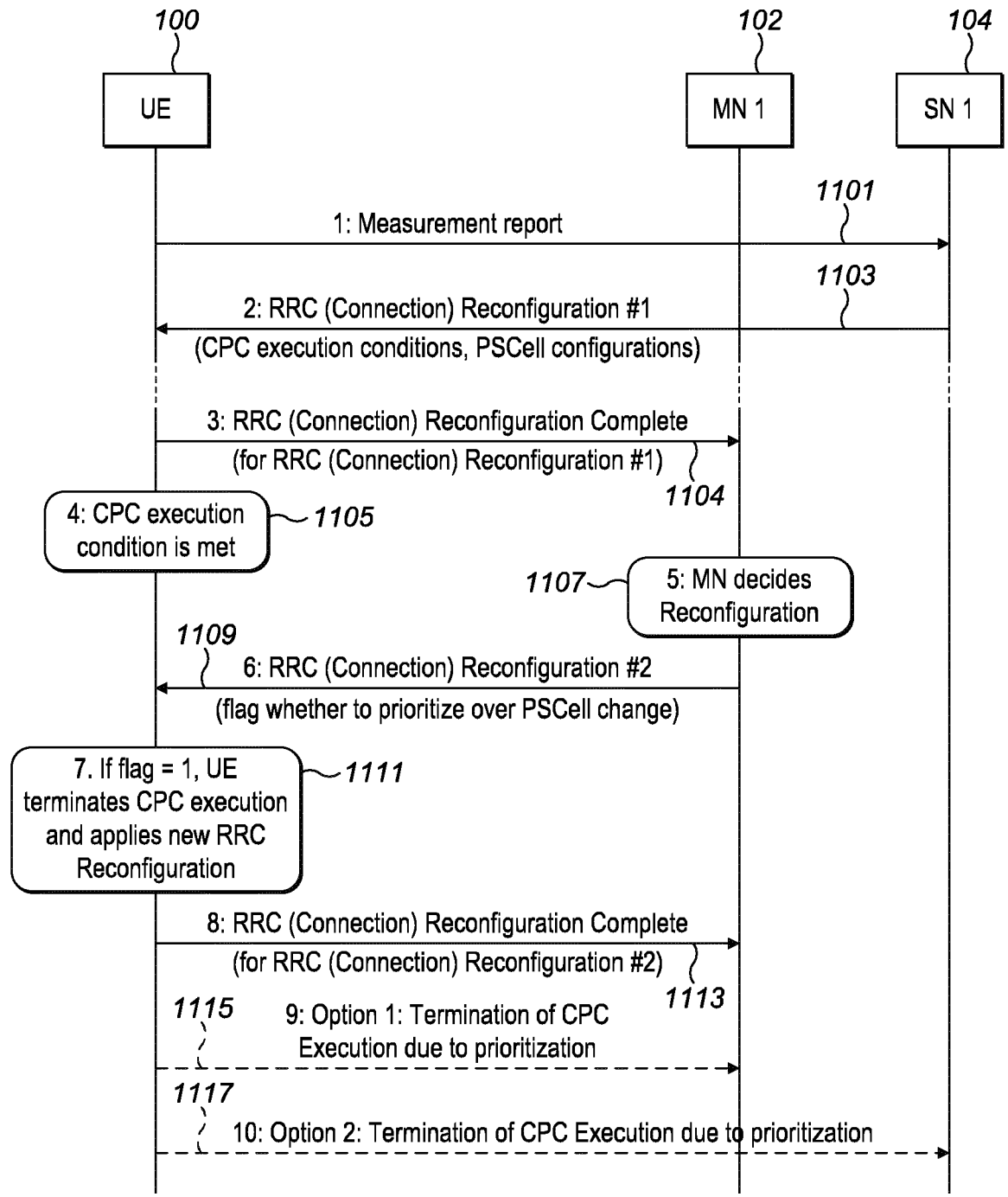
FIG. 11 shows another example of the subject matter described herein.

FIG. 7 represents a first general approach in which the flag can either indicate discarding the second RRC reconfiguration message #2 after execution of the first RRC reconfiguration message #1, or executing the second RRC reconfiguration message #2 after execution of the first RRC reconfiguration message #1. FIG. 11 represents a second general approach in which the flag can indicate priority, and therefore interrupt ongoing execution of an existing RRC reconfiguration message #1.

Figure 8:
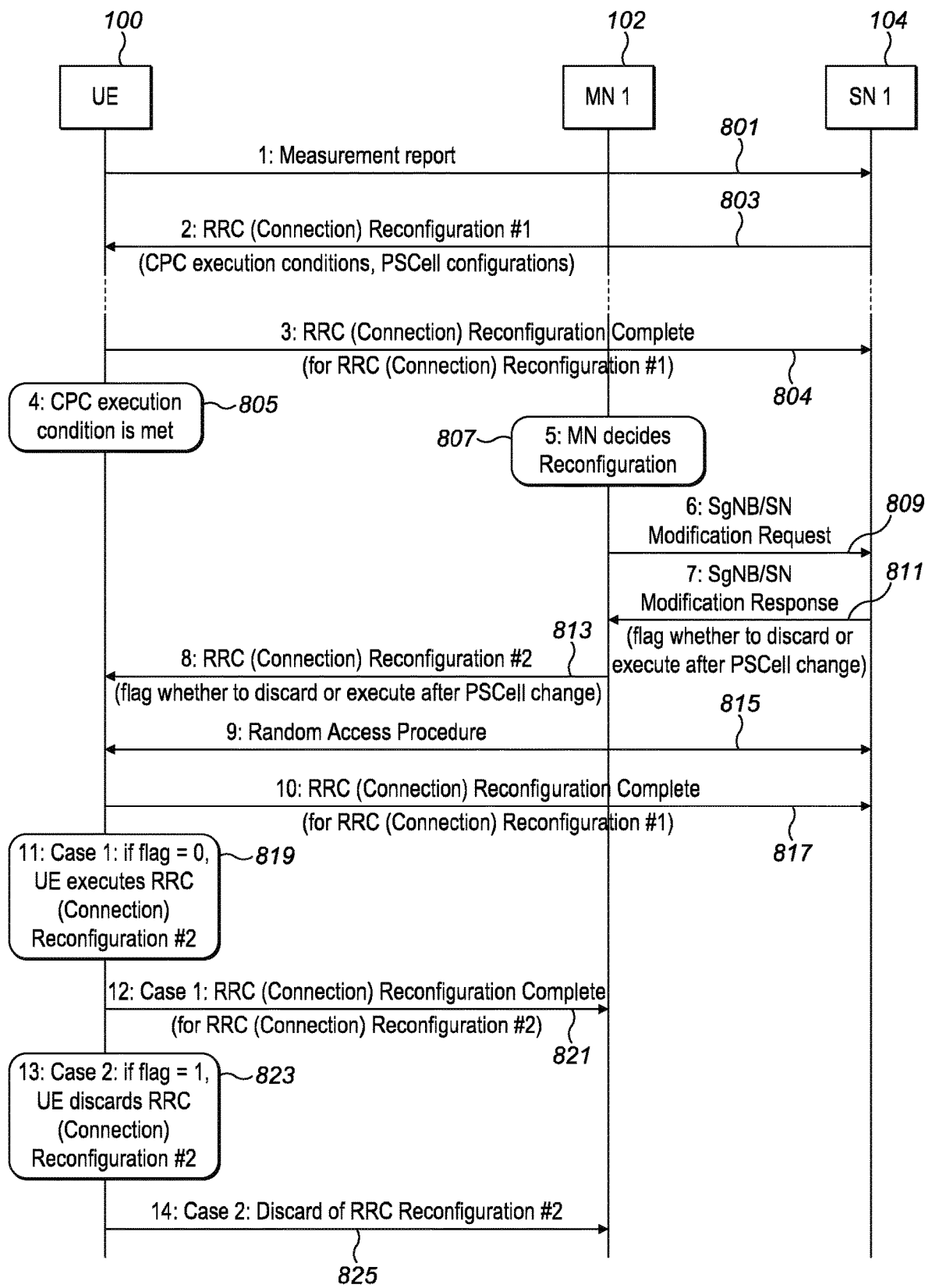
FIG. 8 shows another example of the subject matter described herein.
Figure 9:
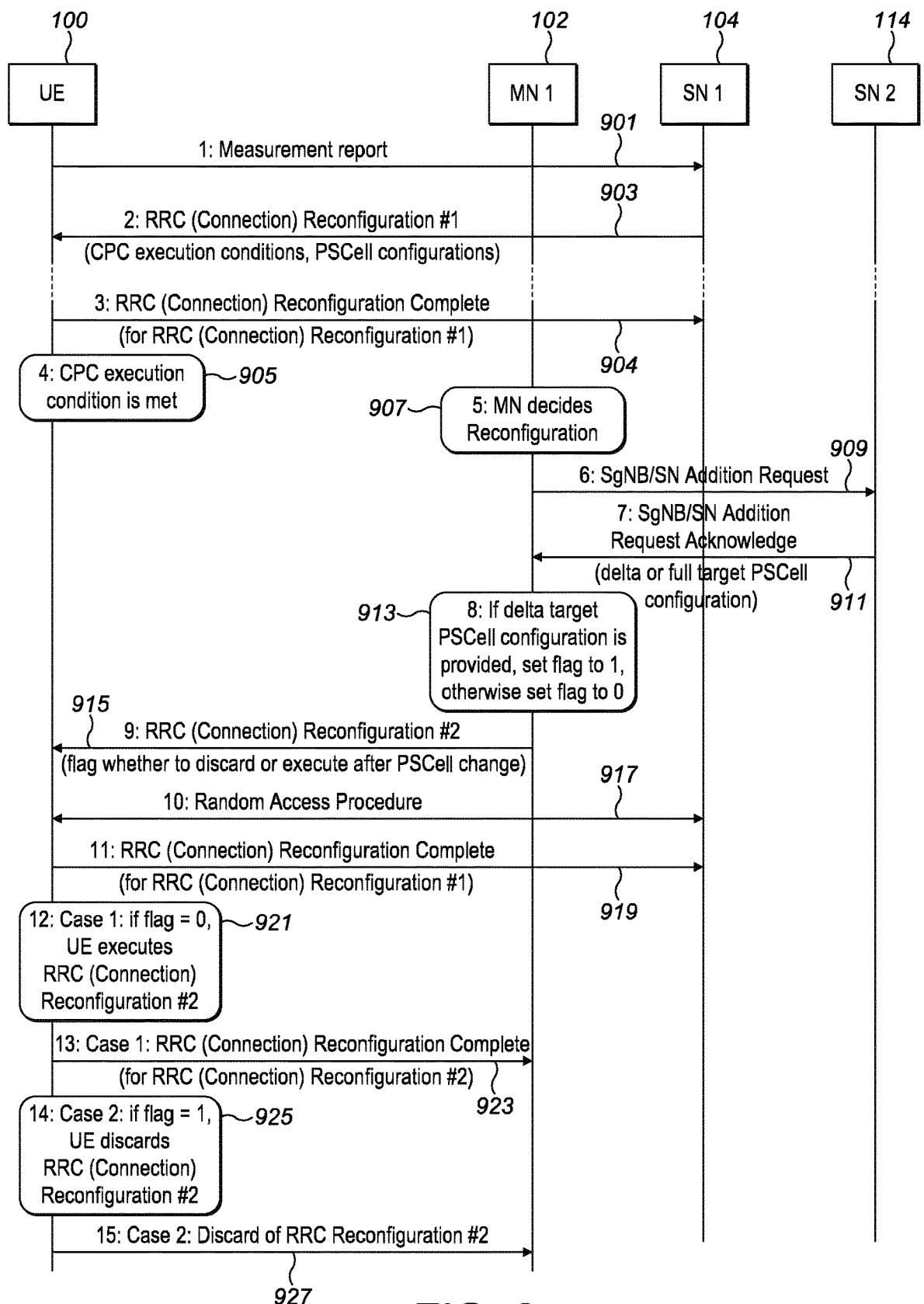
FIG. 9 shows another example of the subject matter described herein.

In at least some examples, the way in which the flag is determined can depend on whether the RRC reconfiguration message #2 is an SN modification, an SN change and/or a MN change. FIGS. 8-10 relate to these individual cases, in accordance with the approach of FIG. 7.

Starting with FIG. 7, operations 701, 703, 704, 705, 707 relate to an existing CPC reconfiguration message #1 and correspond to operations 601, 603, 604, 605, 607 of FIG. 6. Alternatively, the existing reconfiguration message #1 may be non-conditional as defined in operations 401, 403 of FIG. 4.

Operation 709 comprises the MN 102 sending the RRC reconfiguration message #2 (comprising reconfiguration message information) to the UE 100, and further comprises the MN 102 sending to the UE 100 a flag indicating an action to be taken by the UE 100 after execution of an existing RRC reconfiguration message #1. The flag is configured to distinguish between:

'discard'=discarding the RRC reconfiguration message #2 without commencing execution of RRC reconfiguration message #2; or 'execute'=executing the RRC reconfiguration message #2 after executing an existing RRC reconfiguration message #1.

The term 'flag' in the broadest sense refers to an 'indicator' of which action to take. The flag could be a Boolean flag=0 or 1. One of the values indicates 'discard' and the other value indicates 'execute'.

There are various ways to determine how the flag should be set. Some examples comprise providing an entity (e.g. MN or SN) with knowledge of both messages #1 and #2, so that the entity can make a determination (compliance determination) of whether the UE 100 will be able to comply with RRC reconfiguration message #2 after execution of a known existing reconfiguration message #1. Some examples involve determining whether the new configuration will be a delta configuration or a full configuration, wherein the flag may indicate 'discard' in the case of a delta configuration. Use cases for these examples are described later.

Following operation 709, the UE 100 receives the flag and may store the flag for checking after execution of the existing RRC reconfiguration message #1, e.g. after operation 711 and 713 (corresponding to operations 613, 615). The UE 100 can then perform the action indicated by the value of the flag.

In case of CPC, the flag could be specific for each prepared target PSCell in the same SN 104, as they may have different configurations. For example, if the existing RRC reconfiguration message #1 is a CPC, sending the flag may comprise sending a plurality of flags associated with different cells of the same SN 104, wherein the different cells have different configurations. Therefore, the UE 100 may check a first flag if execution of the first RRC reconfiguration message #1 comprised selecting a first cell as a new PSCell, and may check a second flag instead if execution of the first RRC reconfiguration message #1 comprised selecting a different cell as a new PSCell.

If the UE 100 is not currently executing an existing RRC reconfiguration message #1, the UE 100 may not check the flag. For example, if the RRC reconfiguration message #2 is received at a time when the UE 100 is not executing an existing RRC reconfiguration message #1, the UE 100 may execute the RRC reconfiguration message #2 without performing the action indicated by the flag, e.g. without checking the flag. This includes if the RRC reconfiguration message #2 is received between operations 704 and 705 while waiting for satisfaction of the CPC execution condition.

In at least some examples the UE 100 can check the flag at least when the existing RRC reconfiguration message #1 is without MN-involvement. In at least some examples the flag can be checked when the existing RRC reconfiguration message #1 comprises a PSCell change without MN-involvement.

Referring back to FIG. 7, if the flag indicates that the new RRC reconfiguration message #2 is to be executed after the first RRC reconfiguration message #1, the UE 100 executes the new RRC reconfiguration message #2 at operation 715.

At operation 717, the UE 100 sends to the MN 102 a report of the action taken by the UE 100. In this case, the action was executing the new RRC reconfiguration message #2 after executing the existing RRC reconfiguration message #1.

If the flag indicates that the new RRC reconfiguration message #2 is to be discarded, the UE 100 discards (e.g. ignores) the new RRC reconfiguration message #2 at operation 719 without executing the message #2. At operation 721, the UE 100 sends to the MN 102 a report of the action taken by the UE 100. In this case, the action was discarding.

FIGS. 8-10 set out various use cases for the approach of FIG. 7.

FIG. 8 relates to the approach of FIG. 7 in a first scenario. In FIG. 8, the RRC reconfiguration message #2 comprises a MN-initiated SN modification without changing SN 104 or MN 102, to execute a modification such as modifying SCG bearer X. The existing reconfiguration message #1 comprises a PSCell change, optionally wherein the change is a CPC as shown.

In FIG. 8, operations 801, 803, 804, 805 correspond to operations 701, 703, 704, 705. Operation 807 corresponds to operation 707. The example of FIG. 8 comprises additional operations 809 and 811 for obtaining the flag, performed after 807 and prior to 813.

At operation 809, the MN 102 sends a query to the serving SN 104 that will be affected by the RRC reconfiguration message #2. The SN 104 is a node that could have initiated an existing RRC reconfiguration message #1 without MN-involvement. The query may be a modification request. If the SN 104 is a gNB, the modification request may be a SgNB Modification Request. The query is sent to this serving SN 104 at least because request #2 is a SN modification without a SN/MN change.

In response to operation 809, the SN 104 makes the compliance determination of whether the UE 100 will be able to comply with RRC reconfiguration message #2 after execution of an existing reconfiguration message #1 known to the SN 104. The SN 104 is able to make this determination since the SN 104 has knowledge of both messages #1 and #2. The knowledge of message #2 comes from the SgNB Modification Request. The SN 104 has knowledge of the ongoing RRC reconfiguration message #1 because the SN 104 sent the ongoing message #1 and may have received a reply (e.g. operation 804). In this example, the SN 104 may set the flag.

At operation 811, the SN 104 sends a response to the MN 102 such as an acknowledge message (e.g. SgNB Modification Response). Sending the response may comprise sending the flag to the MN along with reconfiguration message information indicative of the new configuration for message #2 (e.g. new SCG configuration of SN2 114, comprising a target PSCell).

Having obtained the flag, the MN 102 can then forward to the UE 100 the flag which the MN 102 obtained from the SN 104, along with the reconfiguration message information of the new RRC reconfiguration message #2 (operation 813). The MN 102 does not necessarily need to know or lookup the flag/compliance determination by the SN 104. Subsequent operations 815, 817, 819, 821, 823, 825 correspond to operations 711, 713, 715, 717, 719, 721.

In an alternative example, the MN 102 may obtain the flag by receiving the SN's compliance determination enabling the flag to be set. The MN 102 then sets the flag.

In another example, for new RRC Reconfiguration #2 containing SCG modifications, the source PSCell in SN1 can make the decision about the flag since it provides the new SCG configuration (containing the modifications) and is aware of the configuration of new target PSCell in the same SN.

In an example, for new RRC Reconfiguration #2 containing inter-SN PSCell change (MN or SN initiated), the source PCell in MN 1 can make the decision about the flag based on the indication received from the target PSCell in SN 2 about whether full or delta configuration is applied for PSCell change. Herein, the source PCell in MN 1 may configure the UE to apply the new RRC Reconfiguration after PSCell change in case of full configuration.

In a further alternative example, the MN 102 can set the flag by receiving from the SN 104 information associated with the existing reconfiguration message. For example, the SN 104 may inform the source MN 102 about the existing PSCell change (CPC or non-conditional) that has been provided to the UE 100. The information may indicate 1) a configuration of the existing configuration message and/or 2) whether the existing configuration message comprises a full or a delta configuration.

In another example, for new RRC Reconfiguration #2 containing an inter-MN handover with/without MN initiated SN change, the source PCell in MN1 can make the decision about the flag: In one embodiment, the new target MN 2 informs the source MN1 whether the new target PSCell in SN 2 is configured with full configuration or delta configuration with respect to source PSCell in SN1. MN 1 may configure the UE to apply the new RRC Reconfiguration after PSCell change in case of full configuration.

FIG. 9 relates to the approach of FIG. 7 in a second scenario. In FIG. 9, the RRC reconfiguration message #2 comprises a MN-initiated SN change without a MN change, to execute an inter-SN change from source SN1 104 to target SN2 114. The existing reconfiguration message #1 comprises a PSCell change, optionally wherein the change is a CPC as shown.

In FIG. 9, operations 901, 903, 904, 905, 907 correspond to operations 701, 703, 704, 705, 707. The example of FIG. 9 comprises additional operations 909 and 911 after 907 and prior to 913.

At operation 909, the MN 102 sends a query to the target SN (SN2 114) that will be affected by the RRC reconfiguration message #2. The query is sent to SN2 114 at least because message #2 comprises an SN change to SN2 114. The query may be an addition request for adding SN2 114. If the SN2 114 is a gNB, the addition request may be a SgNB Addition Request.

At operation 911, SN2 114 sends a response to the MN 102 such as an acknowledge message (e.g. SgNB/SN Addition Request Acknowledge). Sending the response may comprise sending reconfiguration message information indicative of the new configuration for message #2, such as the new SCG configuration of SN2 114, comprising a target PSCell. This reconfiguration message information may include an indication of whether a full configuration or a delta configuration is to be provided to the UE 100.

At operation 913, the MN 102 determines whether a full configuration or a delta configuration is to be provided to the UE 100 with the new RRC reconfiguration message #2. In this example, the MN 102 obtains the flag by setting the flag itself. If a delta configuration is to be provided, the flag may be set to 'discard'. If the full configuration is to be provided, the flag may be set to 'execute'. In an alternative example, the flag could be set by another node with knowledge of the full/delta configuration.

In some examples, the source SN1 104 may send the MN 102 reconfiguration message information indicative of the configuration (e.g. of the target PSCell of SN1 104) associated with the existing RRC reconfiguration message #1. This enables the MN 102 to determine whether the UE 100 will fail to comply with the new RRC reconfiguration message #2 if executed after the existing RRC reconfiguration message #1. Therefore, a delta configuration could sometimes be allowed to 'execute' if the MN 102 can determine that compliance is possible.

In operation 915, the MN 102 sends the new RRC reconfiguration message #2 (comprising the reconfiguration message information for message #2) and the flag to the UE 100. Subsequent operations 917, 919, 921, 923, 925, 927 correspond to 711, 713, 715, 717, 719, 721.

FIG. 10 relates to the approach of FIG. 7 in a third scenario. In FIG. 10, the RRC reconfiguration message #2 comprises an inter-MN handover with a MN-initiated SN change, to execute an inter-MN change from MN1 102 to MN2 112 and an inter-SN change from SN1 104 to SN2 114. Alternatively, the message #2 may not comprise a SN change. The existing reconfiguration message #1 comprises a PSCell change, optionally wherein the change is a CPC as shown.

In FIG. 10, operations 1001, 1003, 1004, 1005, 1007 correspond to operations 701, 703, 704, 705, 707. The example of FIG. 10 comprises additional operations 1009, 1011, 1013, 1015 after 1007 and prior to 1017.

At operation 1009, MN1 102 sends a query to the target MN2 112, which is a node that will be affected by the RRC reconfiguration message #2. The query may be a Handover Request message. The query is sent to MN2 112 at least because message #2 comprises a MN change.

If an inter-SN change is to be performed, operations 1011 and 1013 are performed, which comprise the same type of query and response as earlier-described operations 909 and 911, except this time they are communicated between the MN2 112 and the target SN2 114. This enables MN2 112 to obtain the reconfiguration message information indicative of the new configuration for message #2, e.g. the SCG configuration of SN2 114. SN2's response may include an indication of whether a full configuration or a delta configuration is to be provided to the UE 100.

At operation 1015, MN2 112 sends a response to the query, (e.g. Handover Request Acknowledge message) to MN1 102 with a configuration that MN1 102 can provide to the UE 100 as part of the RRC reconfiguration message #2. MN2's response may further include the indication of whether a full configuration or a delta configuration is to be provided to the UE 100. This enables MN1 102 to perform operation 1017 (set flag) which is equivalent to operation 913: discard if delta; execute if full. Alternatively, another node may perform compliance determination and/or flag determination.

In operation 1019, MN1 102 sends the new RRC reconfiguration message #2 (comprising reconfiguration message information) and the flag to the UE 100. Subsequent operations 1021, 1023, 1025, 1027, 1029, 1031 correspond to 711, 713, 715, 717, 719, 721.

FIG. 11 represents a second general approach in which the flag can indicate whether the new RRC reconfiguration message #2 should be prioritized. Prioritizing the new RRC reconfiguration message #2 over execution of an existing RRC reconfiguration message #1 comprises terminating ongoing execution of the existing reconfiguration message #1 (e.g. intra-SN CPC/PSCell change), and executing the new RRC reconfiguration message #2. The UE 100 may indicate to one or more nodes (e.g. MN 102 or SN 104) that the existing RRC reconfiguration message has been terminated.

In FIG. 11, operations 1101, 1103, 1104, 1105, 1107 correspond to operations 601, 603, 604, 605, 607.

Operation 1109 comprises the MN 102 sending the RRC reconfiguration message #2 to the UE 100, and further comprises the MN 102 sending to the UE 100 a flag indicating an action to be taken by the UE 100 during or after execution of an existing RRC reconfiguration message #1. The flag is configured to distinguish between:

'prioritize'=prioritizing execution of the new RRC reconfiguration message #2 over execution of an existing RRC reconfiguration message #1; or 'discard' and/or 'execute' as described earlier.

An example situation in which an RRC reconfiguration message #2 should be high priority is a PCell change, i.e. an intra-MN or inter-MN handover. The flag therefore reduces the chance of RLF.

Following operation 1109, the UE 100 may decode and check the flag without waiting to complete execution of the existing RRC reconfiguration message #1.

If the flag is 'prioritize', the UE 100 executes the new RRC reconfiguration message #2 at operation 1111. The UE 100 first terminates ongoing execution of the existing reconfiguration message #1, e.g. not performing operations 711/713.

If the new RRC reconfiguration message #2 comprises a delta configuration with respect to the serving SN 104, the UE 100 may first revert to its original SN configuration to provide the correct reference configuration for the new delta configuration. Then, the delta is applied. This approach comprises the UE 100 storing a revertable copy of its original SN configuration during execution of the existing RRC reconfiguration message #1. If the new RRC reconfiguration message #2 comprises a full configuration, the reverting is not required.

At operation 1113, the UE 100 sends to the MN 102 a reply similar to operation 713 but relating to message #2 rather than message #1.

In some examples, the UE 100 can send to one or more nodes a report that the existing RRC reconfiguration message #1 was terminated prior to completed execution, e.g. due to prioritization of the new RRC reconfiguration message #2. At operation 1115 the UE 100 sends this report to the MN 102. At operation 1117, the UE 100 sends this report to the SN 104 that instructed message #1.

The messages of operations 1113 and/or 1115 and/or 1117 may be sent as part of a Successful Handover Report as defined in 3GPP.

In at least some examples, the other value of the flag indicates whether the RRC reconfiguration message #2 shall be discarded or applied (following FIGS. 7-10) after completing the existing reconfiguration message #1. In one example, the other value of the flag is 'discard'. In another example, the other value of the flag is 'execute'. In a further example, the flag can distinguish between the three described actions, 'prioritize', 'discard', and 'execute'. In some examples, the flag can distinguish between even more actions than those described herein.

In some, but not necessarily all examples, the existing RRC reconfiguration message #1 may be restarted after the UE 100 has executed the prioritized RRC reconfiguration message #2 (e.g. after operation 1111/1115/1117).

Although the 'prioritize' approach of FIG. 11 is described as beneficial for a PCell change, the approach could be applied to other scenarios.

The two approaches described above (FIG. 11 vs FIGS. 7-10) are not necessarily alternatives. For example, the UE 100 may check the flag immediately, to determine whether to wait before performing the action 'discard' or 'execute', or to immediately perform the action 'prioritize'.

Figure 12:
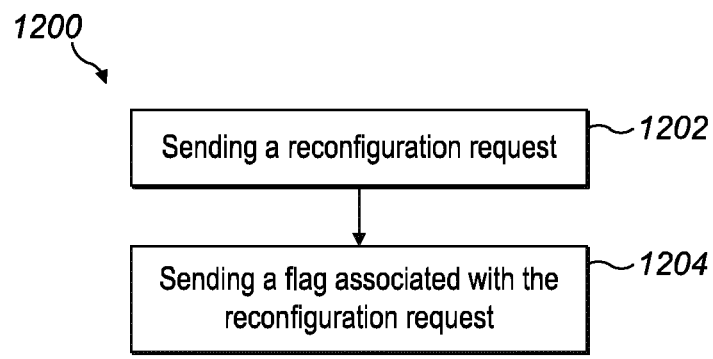
FIG. 12 shows another example of the subject matter described herein.

FIG. 12 illustrates a method 1200 that may be performed at one or more of the nodes described herein. The method comprises, during multi-connectivity:

at block 1202 (e.g. operation 709), sending reconfiguration message information associated with a reconfiguration message (e.g. sending the reconfiguration message) for execution by a UE 100; and at block 1204 (e.g. operation 709), sending a flag or information that causes the flag to be set (e.g. full/delta configuration), indicating an action to be taken by the UE 100 during or after execution by the UE 100 of an existing reconfiguration message #1, wherein the flag is configured to distinguish between at least two of the following actions: 'discard'; 'execute'; or 'prioritize' as defined earlier. In some examples the method 1200 is performed by a MN such as MN 1 102, which sends both the reconfiguration message and the flag to the UE. Optionally, the method 1200 may further comprise one or more of the sending/receiving/determining operations of MN1 102 in the preceding FIGS. 7-11 and description. The MN1 102 may also be configured to perform the role of MN2 112 in sessions with other UEs.

Figure 13:
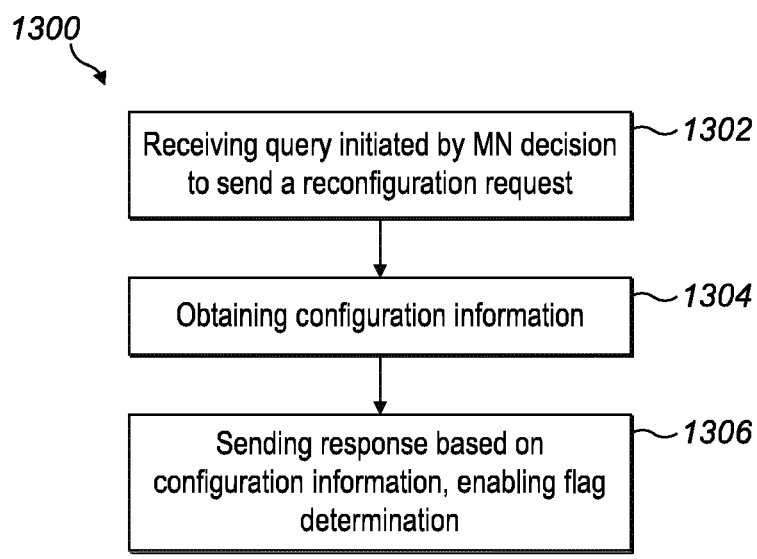
FIG. 13 shows another example of the subject matter described herein.

FIG. 13 illustrates a method 1300 that may be performed at a MN such as MN2 112 in the inter-MN handover of FIG. 10. The method comprises, during multi-connectivity:

at block 1302 (e.g. operation 1009), receiving a query from a first (serving) MN 102, wherein the query is initiated by a decision by the first MN 102 to send a reconfiguration message for execution by a UE 100, wherein the reconfiguration message comprises an inter-MN handover from the first MN 102 to a target MN 112;

at block 1304 (e.g. operations 1011, 1013), obtaining configuration information associated with the reconfiguration message; and at block 1306 (e.g. operation 1015), sending a response to the query, based on the configuration information, to enable the first MN 102 to send a flag indicating the action to be taken by the UE 100 during or after execution by the UE 100 of an existing reconfiguration message, wherein the flag is configured to distinguish between at least two of the following actions: 'discard'; 'execute'; or 'prioritize' as defined earlier. Optionally, the method 1300 may further comprise one or more of the sending/receiving/determining operations of MN2 112 in the preceding FIGS. 7-11 and description. The MN2 112 may also be configured to perform the role of MN1 102 in sessions with other UEs.

Figure 14:
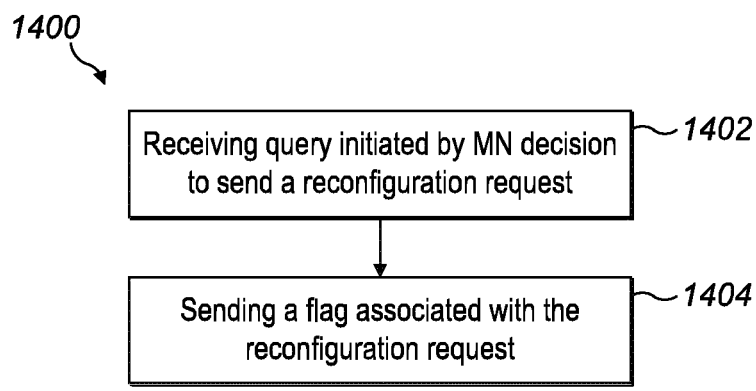
FIG. 14 shows another example of the subject matter described herein.

FIG. 14 illustrates a method 1400 that may be performed at a SN such as SN1 104. The method comprises, during multi-connectivity:

at block 1402, receiving a query from a master node 102, wherein the query is indicative of a master-node initiated decision to send a reconfiguration message for execution by a UE 100; and at block 1404, sending a response to the query, wherein the response comprises a flag indicating an action to be taken by the UE 100 during or after execution by the UE 100 of an existing reconfiguration message, wherein the flag is configured to distinguish between at least two of the following actions: 'discard'; 'execute'; or 'prioritize' as defined earlier. Optionally, the method 1400 may further comprise one or more of the sending/receiving/determining operations of SN1 104 in the preceding FIGS. 7-11 and description. The SN1 104 may also be configured to perform the role of SN2 114 in sessions with other UEs.

Figure 15:
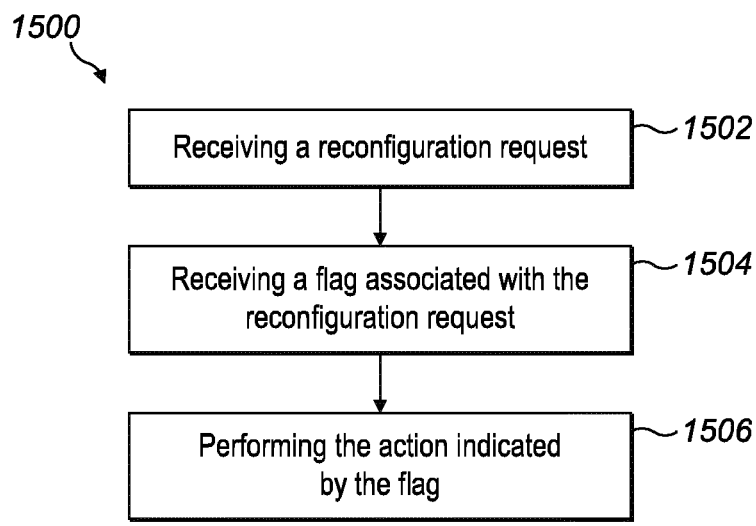
FIG. 15 shows another example of the subject matter described herein.

FIG. 15 illustrates a method 1500 that may be performed at a UE 100. The method comprises, during multi-connectivity:
  at block 1502, receiving a reconfiguration message for execution by a UE 100;
  at block 1504, receiving a flag indicating an action to be taken by the UE 100 during or after execution by the UE 100 of an existing reconfiguration message; and
  at block 1506, performing the action indicated by the flag during or after execution by the UE 100 of an existing reconfiguration message, wherein the flag is configured to distinguish between at least two of the following actions: 'discard'; 'execute'; or 'prioritize' as defined earlier. Optionally, the method 1500 performed at the mobile equipment 100 may further comprise one or more of the sending/receiving/determining operations of the UE 100 in the preceding FIGS. 7-11 and description.

Figure 16:
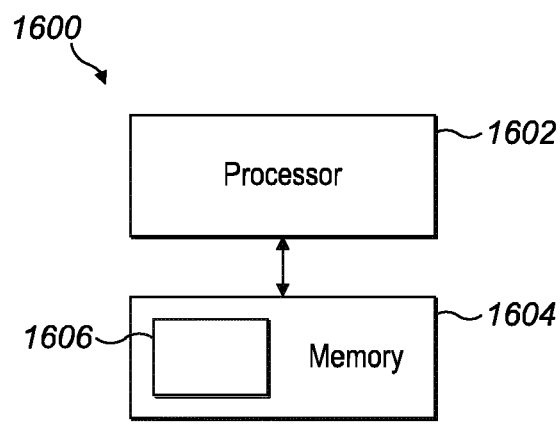
FIG. 16 shows another example of the subject matter described herein.

FIG. 16 illustrates an example of a controller 1600. Implementation of a controller 1600 may be as controller circuitry. The controller 1600 may be implemented in hardware alone, have certain aspects in software including firmware alone or can be a combination of hardware and software (including firmware).

As illustrated in FIG. 16 the controller 1600 may be implemented using instructions that enable hardware functionality, for example, by using executable instructions of a computer program 1606 in a general-purpose or special-purpose processor 1602 that may be stored on a computer readable storage medium (disk, memory etc) to be executed by such a processor 1602.

The processor 1602 is configured to read from and write to the memory 1604. The processor 1602 may also comprise an output interface via which data and/or commands are output by the processor 1602 and an input interface via which data and/or commands are input to the processor 1602.

The memory 1604 stores a computer program 1606 comprising computer program instructions (computer program code) that controls the operation of the apparatus 2 when loaded into the processor 1602. The computer program instructions, of the computer program 1606, provide the logic and routines that enables the apparatus to perform the methods illustrated in FIGS. 4-15. The processor 1602 by reading the memory 1604 is able to load and execute the computer program 1606.

The apparatus 2 therefore comprises: at least one processor 1602; and at least one memory 1604 including computer program code, the at least one memory 1604 and the computer program code configured to, with the at least one processor 1602, cause the apparatus 2 at least to perform any one or more of the methods described herein.

An apparatus 2 can be a base station apparatus implementing at least part of the base station's functionality. For example, the apparatus 2 can be a gNB apparatus or an eNB apparatus. A base station apparatus 2 can be for use as a node in multi-connectivity. For example, a base station apparatus 2 is configured to implement at least part of the functionality of a MN 102, 112 or a SN 104, 114.

Figure 17:
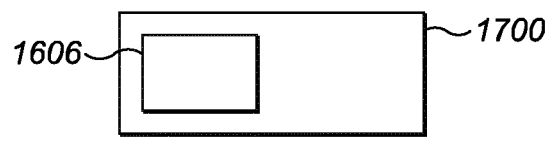
FIG. 17 shows another example of the subject matter described herein.

As illustrated in FIG. 17, the computer program 1606 may arrive at the apparatus 2 via any suitable delivery mechanism 1700. The delivery mechanism 1700 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1606. The delivery mechanism may be a signal configured to reliably transfer the computer program 1606. The apparatus 2 may propagate or transmit the computer program 1606 as a computer data signal.

There is provided computer program instructions for causing an apparatus (e.g. computer) to perform at least the following or for performing at least the methods illustrated in any one or more of FIGS. 4-15.

The computer program instructions may be comprised in a computer program, a non-transitory computer readable medium, a computer program product, a machine readable medium. In some but not necessarily all examples, the computer program instructions may be distributed over more than one computer program.

Although the memory 1604 is illustrated as a single component/circuitry it may be implemented as one or more separate components/circuitry some or all of which may be integrated/removable and/or may provide permanent/semi-permanent/dynamic/cached storage.

Although the processor 1602 is illustrated as a single component/circuitry it may be implemented as one or more separate components/circuitry some or all of which may be integrated/removable. The processor 1602 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
  (a) hardware-only circuitry implementations (such as implementations in only analog and/or digital circuitry) and
  (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
  (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 4-15 may represent steps in a method and/or sections of code in the computer program(s) 1606. The illustration of a particular order to the blocks does not necessarily imply that there is a required or preferred order for the blocks and the order and arrangement of the block may be varied. Furthermore, it may be possible for some blocks to be omitted.

The term operably coupled means that any number or combination of intervening elements can exist (including no intervening elements)

Where a structural feature has been described, it may be replaced by means for performing one or more of the functions of the structural feature whether that function or those functions are explicitly or implicitly described.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized or non-virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A method comprising, during multi-connectivity:
sending a reconfiguration message for execution by a user equipment; and sending a flag indicating an action to be taken by the user equipment during or after execution by the user equipment of an existing reconfiguration message, wherein the flag is configured to distinguish between at least two of the following actions:
discarding the reconfiguration message; executing the reconfiguration message after executing the existing reconfiguration message; or prioritizing execution of the reconfiguration message over execution of the existing reconfiguration message.

2. The method of claim 1, wherein the flag is configured to be dependent on a determination of whether the user equipment will be able to comply with the reconfiguration message after execution of the existing reconfiguration message.

3. The method of claim 2, wherein the action comprises discarding the reconfiguration message in dependence on the determination indicating that the user equipment is not able to comply with the reconfiguration message after execution of the existing reconfiguration message, and
wherein the action comprises executing the reconfiguration message after executing the existing reconfiguration message in dependence on the determination indicating that the user equipment is able to comply with the reconfiguration message after execution of the existing reconfiguration message.

4. The method of claim 1, wherein the flag is configured to be dependent on an indication of whether the reconfiguration message comprise a delta configuration or a full configuration, wherein the delta configuration is dependent on a reference configuration stored in the user equipment that can be changed by the existing reconfiguration message, and wherein the full configuration is not dependent on the reference configuration stored in the user equipment.

5. The method of claim 4, wherein the action comprises discarding the reconfiguration message in dependence on the reconfiguration message comprising the delta configuration, and wherein the action comprises executing the reconfiguration message after executing the existing reconfiguration message in dependence on the reconfiguration message comprising the full configuration.

6. The method of claim 4, wherein the indication of whether the reconfiguration message will comprise the delta configuration or the full configuration is enabled by sending a query to a target node and receiving a response to the query.

7. The method of claim 6, wherein the target node is a target secondary node at least when the reconfiguration message comprises a secondary node change from a serving secondary node to the target secondary node, and wherein the response to the query from the target secondary node is configured to indicate whether the reconfiguration message will comprise the delta configuration or the full configuration.

8. An apparatus for use as at least part of a master node in multi-connectivity, comprising: at least one processor; and at least one memory including instruction, the at least one memory and the instruction configured to, with the at least one processor, cause the apparatus perform at least to:

sending a reconfiguration message for execution by a user equipment; and sending a flag indicating an action to be taken by the user equipment during or after execution by the user equipment of an existing reconfiguration message, wherein the flag is configured to distinguish between at least two of the following actions:

discarding the reconfiguration message;

executing the reconfiguration message after executing the existing reconfiguration message; or prioritizing execution of the reconfiguration message over execution of the existing reconfiguration message.

9. Apparatus of claim 8, wherein the flag is configured to be dependent on a determination of whether the user equipment will be able to comply with the reconfiguration message after execution of the existing reconfiguration message.

10. The apparatus of claim 9, wherein the action comprises discarding the reconfiguration message in dependence on the determination indicating that the user equipment is not able to comply with the reconfiguration message after execution of the existing reconfiguration message, and wherein the action comprises executing the reconfiguration message after executing the existing reconfiguration message in dependence on the determination indicating that the user equipment is able to comply with the reconfiguration message after execution of the existing reconfiguration message.

11. The apparatus of claim 8, wherein the flag is configured to be dependent on an indication of whether the reconfiguration message comprise a delta configuration or a full configuration, wherein the delta configuration is dependent on a reference configuration stored in the user equipment that can be changed by the existing reconfiguration message, and wherein the full configuration is not dependent on the reference configuration stored in the user equipment.

12. The apparatus of claim 11, wherein the action comprises discarding the reconfiguration message in dependence on the reconfiguration message comprising the delta configuration, and wherein the action comprises executing the reconfiguration message after executing the existing reconfiguration message in dependence on the reconfiguration message comprising the full configuration.

13. The apparatus of claim 11, wherein the indication of whether the reconfiguration message will comprise the delta configuration or the full configuration is enabled by sending a query to a target node and receiving a response to the query.

14. The apparatus of claim 13, wherein the target node is a target secondary node at least when the reconfiguration message comprises a secondary node change from a serving secondary node to the target secondary node, and wherein the response to the query from the target secondary node is configured to indicate whether the reconfiguration message will comprise the delta configuration or the full configuration.

15. A non-transitory computer readable storage medium comprising program instructions that, when executed by an apparatus, cause the apparatus to perform at least:

sending a reconfiguration message for execution by a user equipment; and sending a flag indicating an action to be taken by the user equipment during or after execution by the user equipment of the existing reconfiguration message, wherein the flag is configured to distinguish between at least two of the following actions:

discarding the reconfiguration message; executing the reconfiguration message after executing the existing reconfiguration message; or prioritizing execution of the reconfiguration message over execution of an existing reconfiguration message.

16. The non-transitory computer readable storage medium of claim 15, wherein the flag is configured to be dependent on a determination of whether the user equipment will be able to comply with the reconfiguration message after execution of the existing reconfiguration message.

17. The non-transitory computer readable storage medium of claim 16, wherein the action comprises discarding the reconfiguration message in dependence on the determination indicating that the user equipment is not able to comply with the reconfiguration message after execution of the existing reconfiguration message, and wherein the action comprises executing the reconfiguration message after executing the existing reconfiguration message in dependence on the determination indicating that the user equipment is able to comply with the reconfiguration message after execution of the existing reconfiguration message.

18. The non-transitory computer readable storage medium of claim 15, wherein the flag is configured to be dependent on an indication of whether the reconfiguration message comprise a delta configuration or a full configuration, wherein the delta configuration is dependent on a reference configuration stored in the user equipment that can be changed by the existing reconfiguration message, and wherein the full configuration is not dependent on the reference configuration stored in the user equipment.

19. The non-transitory computer readable storage medium of claim 18, wherein the action comprises discarding the reconfiguration message in dependence on the reconfiguration message comprising the delta configuration, and wherein the action comprises executing the reconfiguration message after executing the existing reconfiguration message in dependence on the reconfiguration message comprising the full configuration.

20. The non-transitory computer readable storage medium of claim 18, wherein the indication of whether the reconfiguration message will comprise the delta configuration or the full configuration is enabled by sending a query to a target node and receiving a response to the query.

* * * * *